United States Patent Office 3,415,812
Patented Dec. 10, 1968

3,415,812
PARTIALLY ACETYLATED SUCROSE-PROPYLENE OXIDE POLYETHER POLYOLS
John Michael Turner, Swansea, Wales, assignor to Chas. Pfizer & Co., Inc., New York, N.Y., a corporation of Delaware
No Drawing. Filed Feb. 8, 1966, Ser. No. 526,001
Claims priority, application Great Britain, Feb. 20, 1965, 7,443/65
4 Claims. (Cl. 260—234)

ABSTRACT OF THE DISCLOSURE

Sucrose-propylene oxide polyether polyols having an average of from about 1 to about 2 combined oxypropylene units per each hydroxy group in the original sucrose molecule which have been acetylated to provide a percentage of acetylated hydroxy groups in relation to the total number of hydroxy groups originally present in the polyether polyol molecule that ranges from about 5 to about 40% and the use thereof in a direct one-step procedure for producing rigid polyurethane foams.

---

This invention relates to new and improved condensation products derived from sucrose. More particularly, it is concerned with certain novel polyether polyols that are useful in the production of rigid polyurethane foams.

In the past, among the various polyether polyols that have been used for the production of rigid polyurethane foams are those which are derived by the condensation of sucrose with a vicinal lower alkylene oxide, such as 1,2-propylene oxide, in an amount sufficient to allow for from one to two molecules of oxide to react per each hydroxy group of the sucrose molecule. Highly rigid foams of acceptable properties, i.e., those possessing fine, regular cell structure and adequate compressive strength, can then be made from such polyether polyols by the so-called "prepolymer" method, which entails first separately preparing the required polyurethane ploymer via the use of an organic polyisocyanate reagent and then producing the rigid polyurethane foam therefrom. Unfortunately, however, it has not, generally speaking, been possible to use these polyether polyols in the past to produce rigid polyurethane foams of acceptable properties by the so-called "one-shot" procedure, which involves a direct one-step production of the polyurethane foam from a mixture of the polyether polyol and the organic polyisocyanate reagent.

In accordance with the present invention, it has now been found that sucrose-propylene oxide polyether polyols having an average of from about one to about two combined oxyproplene units per each hydroxy group in the original sucrose molecule can be chemically modified so as to render them useful in the aforementioned "one-shot" procedure. This is accomplished by partially acetylating them to obtain new products. These products are partially acetylated polyether polyols, having a percentage of acetylated hydroxy groups in relation to the total number of hydroxy groups originally present in the polyether polyol molecule that is in the range of from about 5% to about 40%, with the preferred value being between about 10% to about 30%.

In accordance with the process of the present invention for preparing these novel partially acetylated polyether polyols, a sucrose-propylene oxide polyether polyol derived from 1,2-propylene oxide and having from about one to about two combined oxypropylene units per each hydroxy group in the original sucrose molecule is contacted under substantially anhydrous conditions with acetic anhydride at a temperature that is in the range of from about 20° C. up to about 140° C. for a period of about one to about thirty hours. In general, the partial acetylation process is carried out in the absence of a solvent and the acetic acid byproduct produced during the course of the reaction is subsequently removed by means of distillation, preferably employing a reaction-inert organic solvent such as benzene or toluene in the final stages of the procedure to aid in expediting acid removal.

Alternatively, it is also possible to prepare the partially acetylated polyether polyols of this invention by treating the appropriate polyether polyol starting material with acetyl chloride in lieu of the corresponding anhydride used above. This reaction is normally conducted in a reaction inert, neutral organic solvent under substantially anhydrous conditions and in the presence of a basic agent present in sufficient amount to substantially neutralize the liberated hydrogen chloride produced by the reaction. In general, the reaction is carried out at a temperature ranging from between about 20° C. up to about 100° C. for a period of from about one-half to about eight hours. Preferred inert solvents for these purposes include aromatic hydrocarbon solvents such as benzene and toluene, halogenated hydrocarbon solvents such as methylene chloride and chloroform, lower alkyl ketones such as acetone and methyl ethyl ketone, lower alkyl alkanoic acid esters such as ethyl acetate and methyl propionate, lower dialkyl ethers such as diethyl ether and di-isopropyl ether, as well as dioxane and terahydrofuran. Preferred basic agents include alkali metal and alkaline-earth metal oxides, bicarbonates and carbonates, such as magnesium oxide, sodium biacarbonate, sodium carbonate, magnesium carbonate, as well as tertiary organic amines such as triethylamine, pyridine and N,N-dimethylaniline.

The present invention therefore, provides a convenient and facile solution to the problem of obtaining polyether polyols which can be used in the so-called "one-shot" procedure for making rigid polyurethane foams of acceptable properties. It does this by providing for the first time, as indicated above, means for the preparation of partially acetylated polyether polyols derived from sucrose-propylene oxide condensation products having from about one to about two combined oxypropylene units per each hydroxy group in the original sucrose molecule, said novel partially acetylated polyether polyol products being acetylated to the extent that at least about 5% and no more than about 40% of the total number of hydroxy groups originally present in the polyether polyol molecule are acetylated.

A preferred class of partially acetylated polyether polyols of this invention are those having a hydroxyl number of from about 250 to about 450, since the use of such materials or relatively low hydroxyl number in rigid polyurethane foam production makes it possible to employ a lower proportion of the relatively more expensive polyisocynate reagent than is otherwise normally the case. Examples of such polyisocyanate reagents include hexamethylene di-isocyanate, toluene-2,4-di-isocyanante, toluene-2,6-di-isocyanate, toluene-2,4,6-tri-isocyanate, diphenyl-4,4-di-isocyanate and isocyanurate polymers of polyisocyanates like toluene-2,4-di-isocyanate, for example.

It is also further preferred that the partially acetylated polyether polyols of this invention have an average of from about 1.0 to about 1.5 combined oxypropylene units per each hydroxy group of the original sucrose molecule, as the use of these particular novel products greatly facilitates the production of rigid polyurethane foams possessing high compressive strength and dimensional stability.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

To a stainless steel, electrically-heated reaction vessel equipped with a mechanical stirrer, thermometer, reflux condenser, a bleed-inlet tube connected to a source of nitrogen and means for introducing reactants, there were added 800 g. of a sucrose-propylene oxide polyether polyol of hydroxyl number 530 corresponding to 1.1 combined oxypropylene units per each hydroxy group in the original sucrose molecule.

The air in the reaction vessel was then displaced by nitrogen, and the vessel and its contents were heated to 110–120° C. with constant agitation. At this point, 204 g. of acetic anhydride were added dropwise to the reaction vessel (containing the polyether polyol) during the course of a one-half hour period, the temperature being maintained between the aforementioned limits throughout the addition. The resulting mixture was then stirred with continued heating for two hours, and the acetic acid formed (as a byproduct) was subsequently removed by means of distillation under reduced pressure. When the acid value of the reaction mixture had fallen below 0.5 mg. KOH/gram, heating of the reaction vessel and its contents was discontinued.

In this manner, there was obtained a partially acetylated sucrose-propylene oxide polyether polyol product having a viscosity of 49,000 cps. at 33° C. and a hydroxyl number of 347. The latter value corresponded to a percentage of 27.5% for the number of hydroxy groups acetylated in relation to the total number originally present in the polyether polyol starting material.

EXAMPLE II

The procedure described in Example I was followed to prepare a partially acetylated polyether polyol product by reacting 1000 g. of a sucrose-propylene oxide polyether polyol of hydroxyl number 430 (corresponding to 1.5 combined oxypropylene units per each hydroxyl group in the original sucrose molecule) with 100 g. of acetic anhydride in accordance with this very same reaction procedure. In this manner, there was obtained a partially acetylated sucrose-propylene oxide polyether polyol (the acid value of the reaction mixture at this point was 0.45 mg. KOH/g.) having a viscosity of 25,000 cps. at 33° C. and a hydroxyl number of 341, which corresponded to a value of 16.5% for the percentage of acetylated hydroxy groups in relation ot the total number originally presented in the polyether polyol starting material.

EXAMPLE III

The procedure described in Example I was followed to prepare a partially acetylated polyether polyol product except that 100 g. of acetic anhydride were used instead of the amount specified in the aforementioned example. In this manner, there was obtained a partially acetylated sucrose-propylene oxide polyether polyol product having a hydroxyl number of 421, which, in turn, corresponded to a value of 15.5% for the percentage of acetylated hydroxyl groups in relation to the total number originally present in the polyether polyol starting material.

EXAMPLE IV

The procedure described in Example I is repeated to prepare a partially acylated polyether polyol product except that 800 g. of a sucrose-propylene oxide polyether polyol of hydroxyl number 416, corresponding to an average of about 1.6 combined oxypropylene units per each hydroxy group in the original sucrose molecule (prepared as in Example I of Belgian Patent No. 665,226, dated Dec. 10, 1965), is used as starting material instead of the polyether polyol mentioned therein. In this particular case, the corresponding product obtained is also a partially acetylated derivative of the sucrose-propylene oxide polyether polyol starting material.

In like manner, the procedure is repeated using separately a sucrose-propylene oxide polyether polyol starting material of hydroxyl number 455, corresponding to an average of 1.4 combined oxypropylene units per each hydroxy group in the original sucrose molecule (prepared as in Example II of Belgian Patent No. 665,226, dated Dec. 10, 1965), and a sucrose-propylene oxide polyether polyol starting material of hydroxyl number 464, corresponding to an average of about 1.3 combined oxypropylene units per each hydroxy group in the original sucrose molecule (prepared as in Example III of the aforementioned Belgian patent), with comparable results being obtained in each case with respect to the aforementioned acetylation process.

EXAMPLE V

The partially acetylated sucrose-propylene oxide polyether polyol of Example I was used to prepare the following rigid polyurethane foam by the conventional "one-shot" technique of the prior art. In this procedure, the mixture used below is obtained by blending the following ingredients together in the proportions by weight specified:

| | |
|---|---|
| The product of Example I | 100.0 |
| Crude toluene di-isocyanate | 75.8 |
| Trichlorofluoromethane (blowing agent) | 34.0 |
| Silicone oil (emulsifier) | 1.0 |
| Diazabicyclooctane (catalyst) | 0.6 |

The foam produced in this manner rose to its fullest extent in three and one-half minutes, and was tack-free within four minutes. It was also found to have a fine, regular cell structure, excellent compressive strength and good dimensional stability, with a density of 1.85 lbs./cu. ft.

EXAMPLE VI

The partially acetylated sucrose-propylene oxide polyether polyol of Example I was used to prepare the following rigid polyurethane foam by the conventional "one-shot" technique of the prior art. In this procedure, the mixture used below is obtained by blending the following ingredients together in the proportions by weight specified:

| | |
|---|---|
| The product of Example I | 100 |
| Toluene di-isocyanate | 59 |
| Trichlorofluoromethane | 28 |
| Silicone oil | 1.0 |
| Diazabicyclooctane | 0.5 |

The foam obtained in this manner was found to have an extremely fine, regular cell structure, high compressive strength and excellent dimensional stability, with a density of 1.80 lbs./cu. ft.

EXAMPLE VII

The partially acetylated sucrose-propylene oxide polyether polyol of Example I was used to prepare the following rigid polyurethane foam by the conventional "one-shot" technique of the prior art. In this procedure, the mixture used below is obtained by blending the following ingredients together in the proportions by weight specified:

| | |
|---|---|
| The product of Example I | 100 |
| Crude diphenyl di-isocyanate | 100 |
| Trichlorofluoromethane | 37 |
| Silicone oil | 1.0 |
| Diazabicyclooctane | 0.5 |

The foam obtained in this manner was also found to have a fine, regular cell structure, good compressive strength and good dimensional stability, possessing a density of 1.95 lbs./cu. ft.

EXAMPLE VIII

The partially acetylated sucrose-propylene oxide polyether polyol of Example I was used to prepare the following rigid polyurethane foam by the conventional "one-shot" technique of the prior art. In this procedure, the mixture used below is obtained by blending the following ingredients together in the proportions by weight specified:

| | |
|---|---|
| The product of Example I | 100.0 |
| Polymeric polyisocyanate (Carwin Div., Upjohn) | 89.5 |
| Triethylamine | 1.0 |
| Trichlorofluoromethane | 38.0 |
| Silicone oil | 1.0 |
| Diazabicyclooctane | 0.7 |

The foam obtained in this manner was also found to possess a fine, regular cell structure, good compressive strength and good dimensional stability, with a density of 1.90 lbs./cu.ft.

EXAMPLE IX

The partially acetylated sucrose-propylene oxide polyether polyol of Example II was used to prepare the following rigid polyurethane foam by the conventional "one-shot" technique of the prior art. In this procedure, the mixture used below is obtained by blending the following ingredients together in the proportions by weight specified:

| | |
|---|---|
| The product of Example II | 100.0 |
| Toluene di-isocyanate, undistilled | 71.0 |
| Trichlorofluoromethane | 28.0 |
| Silicone oil | 1.0 |
| Triethylamine | 0.35 |
| Diazabicyclooctane | 0.7 |

The foam produced in this manner rose to its fullest extent in one and three-quarter minutes, and was tack-free within two minutes. It was also found to possess a fine, uniform cell structure (90% closed cell content), with high compressive strength and good dimensional stability.

EXAMPLE X

The partially acetylated sucrose-propylene oxide polyether polyol of Example III was used to prepare the following rigid polyurethane foam by the conventional "one-shot" technique of the prior art. In this procedure, the mixture used below is obtained by blending the following ingredients together in the proportions by weight specified:

| | |
|---|---|
| The product of Example III | 100.0 |
| Toluene di-isocyanate, undistilled | 94.0 |
| Trichlorofluoromethane | 36.0 |
| Silicone oil | 2.0 |
| Triethylamine | 0.5 |
| Diazabicyclooctane | 0.7 |

The foam produced in this manner rose to its fullest extent in two minutes, and was tack-free within two and one-quarter minutes. It was also found to possess a fine, uniform cell structure (90% closed cell content), with high compressive strength and good dimensional stability.

What is claimed is:

1. A partially acetylated sucrose-propylene oxide polyether polyol, said polyol having, prior to acetylation, from about one to about two combined oxypropylene units per each hydroxy group in the original sucrose molecule, said partially acetylated polyether polyol having a percentage of acetylated hydroxy groups in relation to the total number of hydroxy groups originally present in the polyether polyol molecule that is in the range of from about 5% to about 40%.

2. A partially acetylated polyether polyol as claimed in claim 1 having a hydroxyl number of from about 250 to about 450.

3. A partially acetylated polyether polyol as claimed in claim 1 which has a viscosity of about 49,000 cps. at 33° C. and a hydroxyl number of about 347, corresponding to a percentage of about 27.5% for the number of hydroxy groups acetylated in relation to the total number originally present in the polyether polyol molecule, said acetylated polyether polyol having about 1.1 combined oxypropylene units per each hydroxy group in the original sucrose molecule.

4. A partially acetylated polyether polyol as claimed in claim 1 which has a viscosity of about 25,000 cps. at 33° C. and a hydroxyl number of about 341, corresponding to a percentage of about 16.5% for the number of hydroxy groups acetylated in relation to the total number originally present in the polyether polyol molecule, said acetylated polyether polyol having about 1.5 combined oxypropylene units per each hydroxy group in the original sucrose molecule.

References Cited

UNITED STATES PATENTS

| | | | |
|---|---|---|---|
| 2,602,789 | 7/1952 | Schwartz et al. | 260—209 |
| 3,102,114 | 8/1963 | Komori et al. | 260—234 |
| 3,324,108 | 6/1967 | Moller et al. | 260—209 |

LEWIS GOTTS, *Primary Examiner.*

JOHNNIE R. BROWN, *Assistant Examiner.*

U.S. Cl. X.R.

260—2.5